US008777650B1

United States Patent
Lin (10) Patent No.: US 8,777,650 B1
(45) Date of Patent: Jul. 15, 2014

(54) QUICK-DETACHABLE MODULAR JACK AND FACE PANEL MOUNTING STRUCTURE

(71) Applicant: Jyh Eng Technology Co., Ltd., New Taipei (TW)

(72) Inventor: Yen-Lin Lin, New Taipei (TW)

(73) Assignee: JYH Eng Technology Co., Ltd., New Taipei (TW)

( * ) Notice: Subject to any disclaimer, the term of this patent is extended or adjusted under 35 U.S.C. 154(b) by 55 days.

(21) Appl. No.: 13/734,677

(22) Filed: Jan. 4, 2013

(51) Int. Cl.
*H01R 13/627* (2006.01)
*H01R 13/514* (2006.01)

(52) U.S. Cl.
CPC .......... *H01R 13/514* (2013.01); *H01R 13/6278* (2013.01); *Y10S 439/953* (2013.01)
USPC ......... 439/353; 439/345; 439/540.1; 439/953

(58) Field of Classification Search
CPC ........................ H01R 13/514; H01R 13/6278
USPC ................. 439/345, 353, 540.1, 953
See application file for complete search history.

(56) References Cited

U.S. PATENT DOCUMENTS

| 3,874,763 | A  | * | 4/1975  | Hoover ........................ 439/345 |
| 7,101,192 | B1 | * | 9/2006  | Bordeau et al. .................. 439/66 |
| 7,104,830 | B1 | * | 9/2006  | Diaz ............................. 439/372 |
| 7,223,109 | B1 | * | 5/2007  | Cors ............................. 439/144 |
| 7,267,569 | B2 | * | 9/2007  | Nakamura ..................... 439/353 |
| 7,285,005 | B2 | * | 10/2007 | Gabrielsson et al. .......... 439/378 |
| 7,806,706 | B2 | * | 10/2010 | Obenshain ................... 439/133 |
| 7,845,975 | B2 | * | 12/2010 | Cheng et al. ................ 439/541.5 |
| 7,976,346 | B2 | * | 7/2011  | Guy et al. .................... 439/638 |
| 8,152,560 | B2 | * | 4/2012  | Malstron et al. .............. 439/488 |
| 8,585,429 | B2 | * | 11/2013 | Rouillard et al. ............. 439/378 |
| 2012/0003868 | A1 | * | 1/2012 | Daugherty et al. ........ 439/540.1 |
| 2014/0094055 | A1 | * | 4/2014 | Wojcik et al. ................. 439/533 |

* cited by examiner

*Primary Examiner* — James Harvey
(74) *Attorney, Agent, or Firm* — Guice Patents PLLC (57) ABSTRACT

A quick-detachable modular jack and face panel mounting structure includes a face panel, an inner positioning frame mounted at the back side of the face panel for holding multiple modular jacks in the face panel in a row, a limiter plate vertically movably mounted in the inner positioning frame, and control rods held down in the inner positioning frame by the limiter plate to lock the modular jacks and respectively horizontally movable to unlock the respective modular jacks.

12 Claims, 7 Drawing Sheets

QUICK-DETACHABLE MODULAR JACK AND FACE PANEL MOUNTING STRUCTURE

BACKGROUND OF THE INVENTION

1. Field of the Invention

The present invention relates the mounting arrangement between a face panel and modular jacks and more particular, to a quick-detachable modular jack and face panel mounting structure, which allows modular jacks to be quickly and detachably mounted in a face panel in rows.

2. Description of the Related Art

When arranging a local area network in a building, optical fiber cables or electrical cables are extended from a server room in the building to modular jacks in the walls at different rooms and different floors of the building so that computers in each room of the building can be connected to the adjacent modular jacks by modular plugs of computer cables.

In the server room, racks are installed to support network switches, servers and other devices. The servers in one rack are electrically connected to a face panel of the respective rack. The face panels of all racks in the server room are electrically connected by network cables.

However, with increase in office business and office personnel and rapid development of network communication technology, some problems may follow. The existing capacity of the network equipment in the server room may be insufficient to meet the needs of the company. However, adding extra network equipment to expand the capacity requires much server room installation space. Using small sized network equipment can save server room space.

Further, modular jacks are normally mounted in respective mounting holes on a face panel and arranged in a row or rows. Springy fastening structures are provided between the mounting holes of the face panel and the modular jacks to detachably secure the modular jacks to the mounting holes of the face panel. However, because the mounting holes of the face panel are kept close to one another, the gap between each two adjacent modular jacks is quite narrow, not allow for the insertion of a finger. If a replacement or repair work is necessary, it will be difficult to detach one individual modular jack from the face panel.

SUMMARY OF THE INVENTION

The present invention has been accomplished under the circumstances in view. It is one object of the present invention to provide a quick-detachable modular jack and face panel mounting structure, which allows a large number of modular jacks to be quickly detachably mounted in a face panel for application.

To achieve this and other objects of the present invention, a quick-detachable modular jack and face panel mounting structure comprises a face panel comprising at least one modular jack hole, at least one modular jack mounted in one modular jack hole of the face panel, each modular jack comprising a fastening structure, an inner positioning frame mounted at the back side of the face panel and comprising a bottom panel and at least one constraint structure located at the bottom panel, at least one control rod mounted in the inner positioning frame and adapted to releasably lock the at least one modular jack, each control rod comprising a front engagement end engageable into one constraint structure of the inner positioning frame and a rear operating end suspending outside the inner positioning frame and operable to unlock the respective control rod from the respective the modular jack, an operating gap defined between a part of the inner positioning frame and the front engagement end of each control rod, and a limiter plate vertically movably mounted in the inner positioning frame and adapted to hold down the at least one control rod in the inner positioning frame.

Preferably, each constraint structure of the inner positioning frame comprises two stop blocks spaced from each other by a predetermined distance, and two plug holes respectively disposed adjacent to the stop blocks. Further, the limiter plate comprises a plurality of plug rods respectively pluggable into the plug holes of the at least one constraint structure of the inner positioning frame.

Preferably, the limiter plate further comprises at least one guide block. Preferably, each control rod further comprises a guide slot longitudinally located at the front engagement end thereof and detachably coupled to one guide block of the limiter plate.

Preferably, the face panel comprises an elongated slot cut through opposing front and back sides thereof and disposed in horizontal. Preferably, the inner positioning frame comprises opposing front panel and back panel respectively upwardly extended from opposing front and rear sides of the bottom panel in a parallel manner, and at least one window opening cut through the front panel and the back panel. Each window opening forms with the elongated slot one respective modular jack hole. The back panel comprises at least one back panel component. The limiter plate further comprises at least one guide notch respectively coupled to the at least one back panel component.

Preferably, the fastening structure of each modular jack comprises a plurality of hook blocks. Preferably, each control rod comprises at least one springy retaining arm obliquely backwardly extended from the front engagement end thereof and stoppable against one constraint structure of the inner positioning frame, and adapted for engagement with the hook blocks of the fastening structure of one modular jack.

Preferably, the limiter plate comprises at least one end flange, a rear opening located on each end flange corresponding to one respective guide block, and a plurality of open slots respectively disposed at two opposite lateral sides relative to each end flanges and adapted to expose the at least one springy retaining arm of each control rod.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
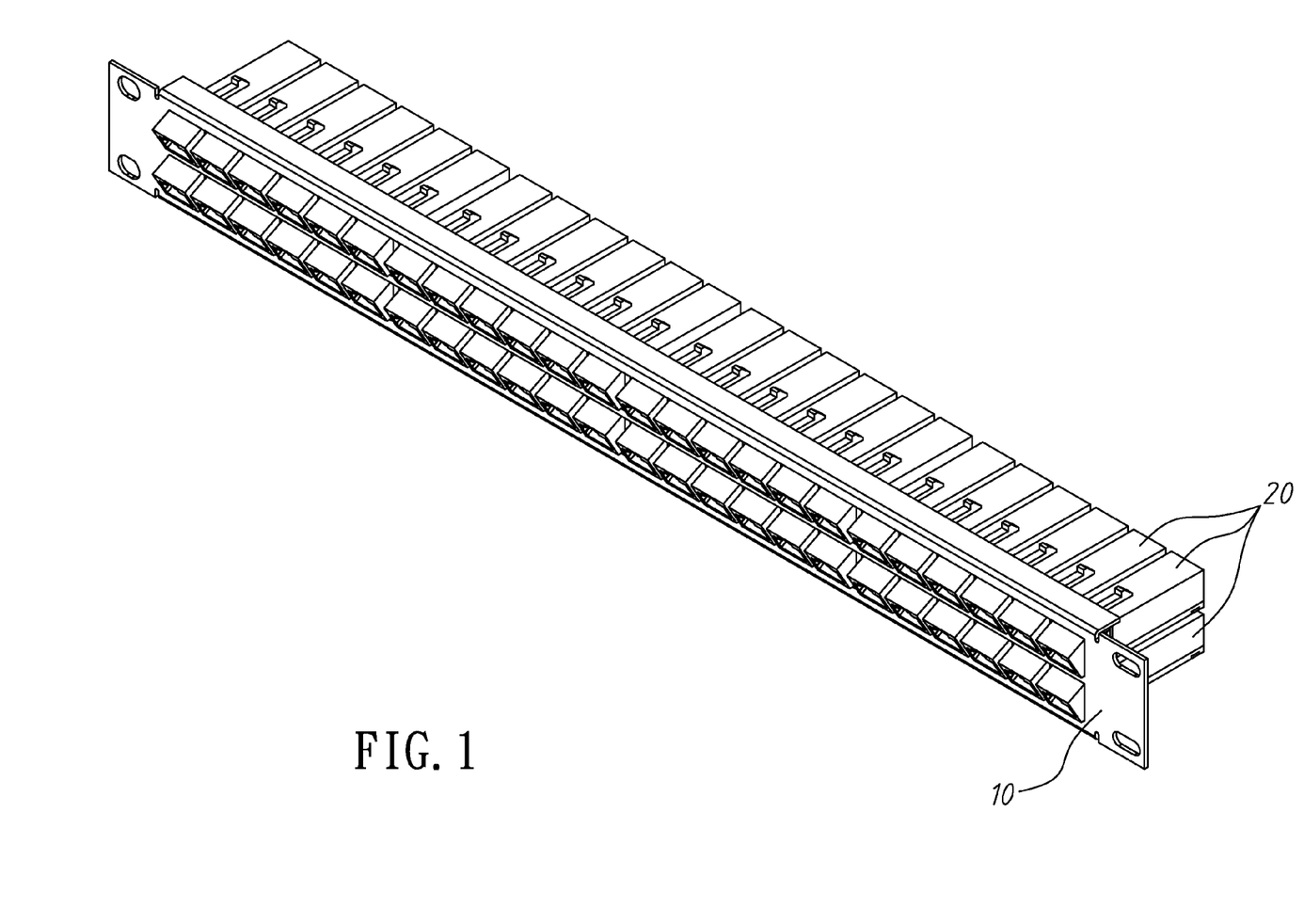
FIG. 1 is an elevational assembly view of a quick-detachable modular jack and face panel mounting structure in accordance with the present invention.

Referring to FIG. 1, a quick-detachable modular jack and face panel mounting structure in accordance with the present invention is shown comprising a face panel 10, an inner positioning frame 30 mounted at a back side of the face panel 10, two limiter plates 40, a plurality of control rods 50, and a plurality of modular jacks 20 mounted in the inner positioning frame 30 and the face panel 10 in rows.

Figure 2:
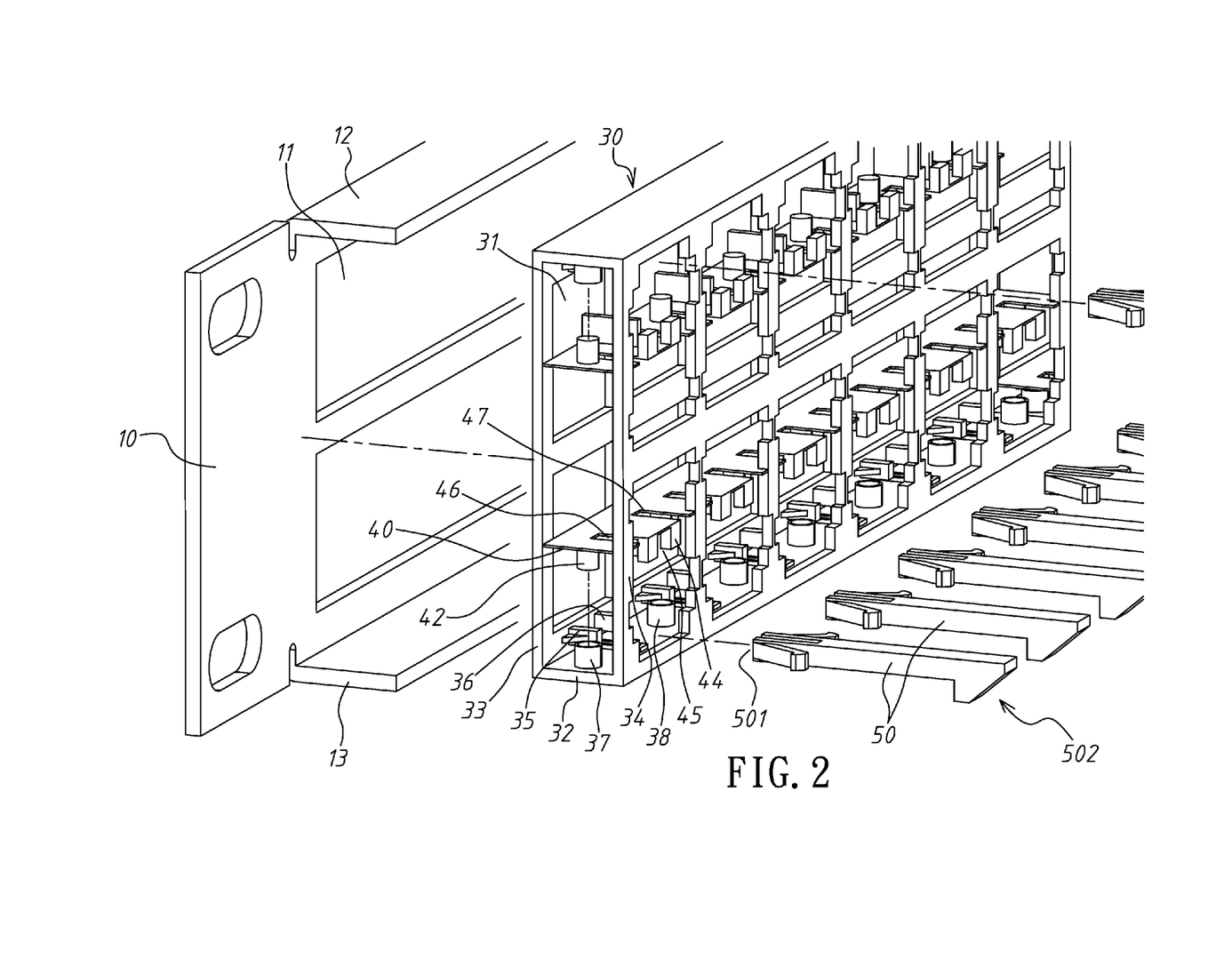
FIG. 2 is an exploded rear side view, in an enlarged scale, of a part of FIG. 1.

Referring to FIG. 2, the face panel 10 comprises at least one, for example, two elongated slots 11 cut through opposing front and back sides thereof and horizontally disposed at different elevations in a parallel manner, and top and bottom flanges 12;13 respectively backwardly extended from opposing top and bottom sides thereof in a parallel manner. The inner positioning frame 30 is mounted at the back side of the face panel 10 between the top and bottom flanges 12;13, and adapted to hold the modular jacks 20 in two rows in the elongated slots 11.

Figure 3:
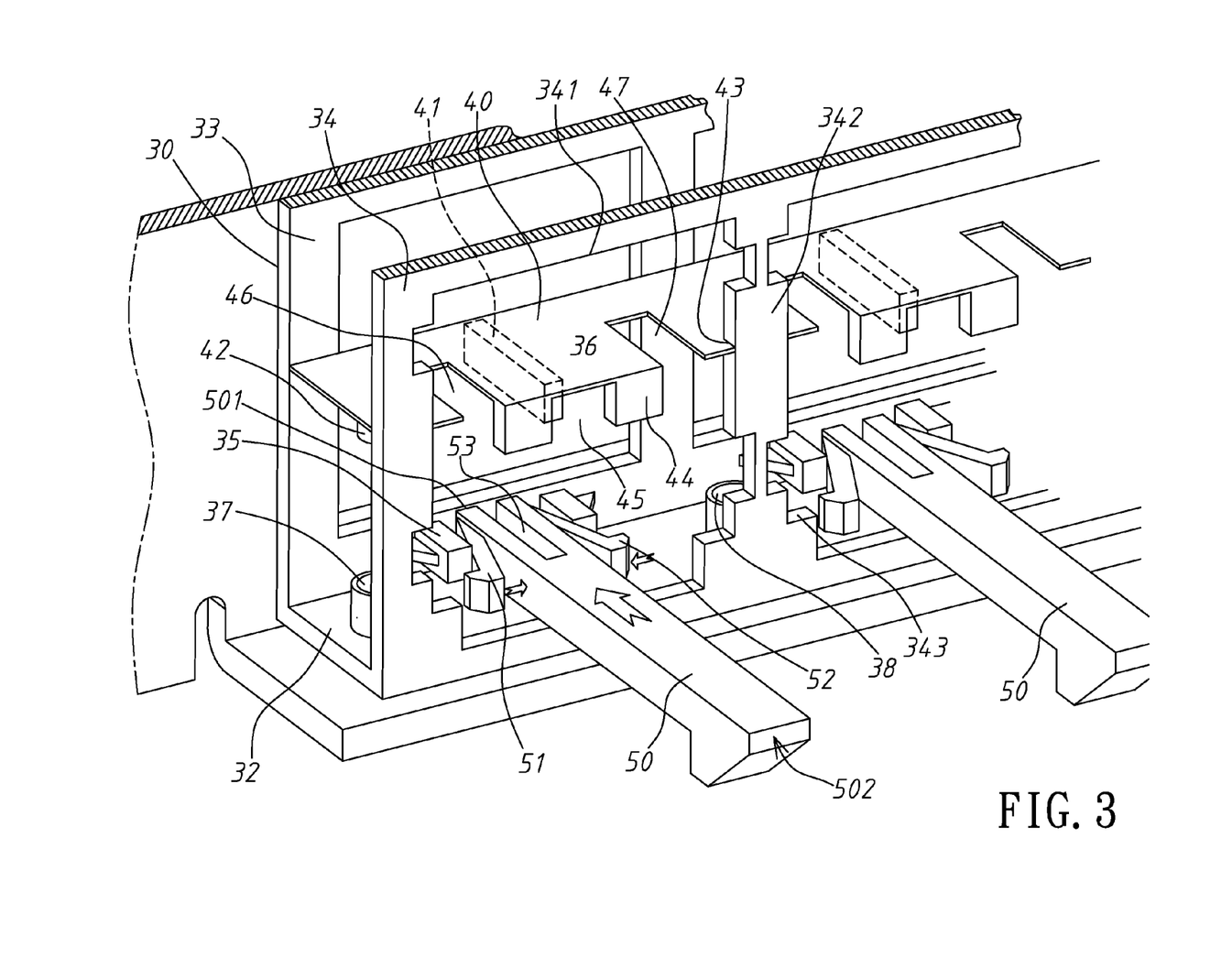
FIG. 3 is a perspective enlarged view of a part of FIG. 2, illustrating one control rod set in the inner positioning frame in position and another control rod initially inserted into the inner positioning frame.

Referring to FIG. 3 and FIG. 2 again, the inner positioning frame 30 comprises a front panel 33 and a back panel 34 vertically arranged in a parallel manner, and opposing top and bottom panel 32 horizontally connected between the front panel 33 and the back panel 34 at opposing top and bottom sides, a plurality of front window openings 31 and rear window openings 341 respectively and symmetrically cut through the front panel 33 and the back panel 34 and arranged in two rows corresponding to the two elongated slots 11 of the face panel 10 for the mounting of the modular jacks 20, and two rows of constraint structures corresponding to the window openings 31. Each constraint structure comprises two stop blocks 35;36 backwardly extended from the front panel 33 adjacent to the top or bottom panel 32 and spaced from each other at a predetermined distance, and two plug holes 37;38 located at the top or bottom panel 32 adjacent to the stop blocks 35;36. Each window opening 31 forms with one elongated slot 11 a respective modular jack hole for accommodating one respective modular jack 20.

The two limiter plates 40 are respectively attached to the two rows of constraint structures between the front panel 33 and the back panel 34. Each limiter plate 40 comprises a plurality of guide blocks 41 respectively disposed corresponding to one respective constraint structure, pairs of plug rods 42 pluggable into the plug holes 37;38 of the respective constraint structures, and a plurality of guide notches 43 respectively slidably coupled to respective back panel components 342 of the back panel 34. The back panel 34 comprises a step 343 at one end of each back panel component 342, defining a dead center to limit the sliding movement of the limiter plate 40 along the back panel components 342.

Each control rod 50 comprises opposing front engagement end 501 and rear operating end 502. The front engagement end 501 is engageable into the inner positioning frame 30 for enabling the respective control rod 50 to secure one respective modular jack 20. After installation of one control rod 50 in the inner positioning frame 30 to secure one respective modular jack 20, the rear operating end 502 suspends outside the inner positioning frame 30 for operation by the user to release the mounted modular jack 20. The control rod 50 has a predetermined width. Each control rod 50 further comprises at least one, for example, two spring springy retaining arms 51;52 obliquely backwardly extended from two opposite lateral sides of the front engagement end 501, and a guide slot 53 longitudinally located on the middle of the front engagement end 501 and coupled to one guide block 41 of one limiter plate 40.

Figure 4:
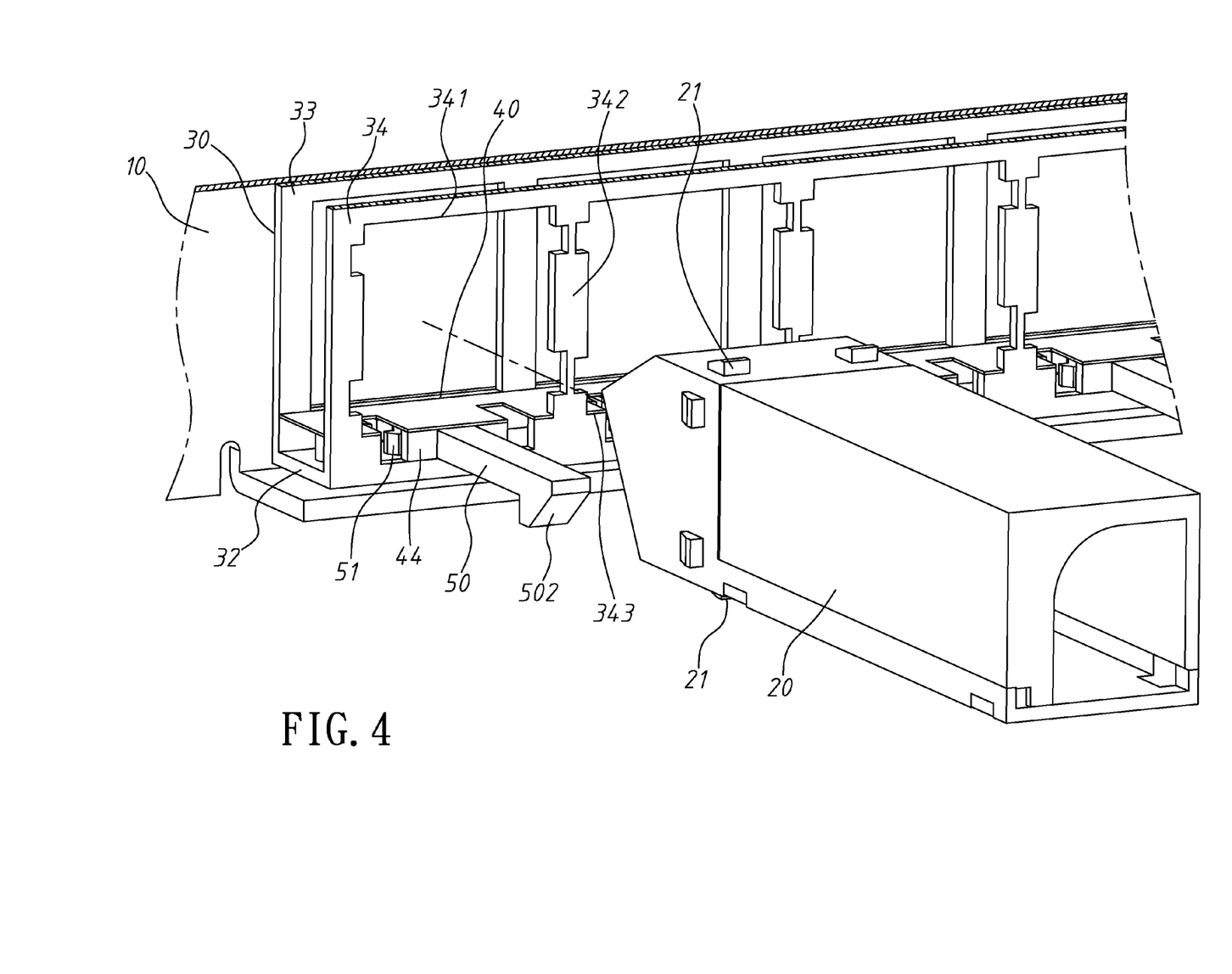
FIG. 4 is an exploded view of a part of the quick-detachable modular jack and face panel mounting structure in accordance with the present invention, illustrating the control rods respectively installed in the inner positioning frame prior to installation of the modular jacks.

Referring to FIG. 3 again, the front engagement ends 501 of the control rods 50 are respectively inserted into the inner positioning frame 30. In FIG. 3, two control rods 50 are shown wherein the front engagement ends 501 of the right control rod 50 is initially inserted in between the two stop blocks 35;36 of one respective constraint structure; the front engagement ends 501 of the left control rod 50 has been inserted in between the two stop blocks 35;36 of one respective constraint structure in position. After insertion of the front engagement ends 501 of the control rods 50 into the gap between the two stop blocks 35;36 of each of the constraint structures, the limiter plates 40 are respectively lowered or lifted toward the top or bottom panel 32 (see also FIG. 4) to force the respective plug rods 42 into the respective plug holes 37;38 and to couple the respective guide blocks 41 to the guide slots 53 of the control rods 50. At this time, the front engagement end 501 of each control rod 50 is kept spaced from the front panel 33 of the inner positioning frame 30 by an operating gap A (see FIG. 6 and FIG. 7), and the spring springy retaining arms 51;52 of each control rod 50 are respectively terminating in a respective free end.

According to the present preferred embodiment, each limiter plate 40 further comprises a plurality of end flanges 44 extending from a rear side thereof at right angles, a rear opening 45 located on each end flange 44 corresponding to one respective guide block 41. The width of the rear openings 45 fits the width of the control rods 50. When the limiter plates 40 are respectively lowered or lifted toward the top or bottom panel 32 to force the respective plug rods 42 into the respective plug holes 37;38, the rear openings 45 of the limiter plates 40 are respectively attached to the control rods 50 tightly. Each limiter plate 40 further comprises a plurality of open slots 46;47 respectively disposed at two opposite lateral sides relative to each of the end flanges 44 to expose the springy retaining arms 51;52 of the control rods 50.

Figure 5:
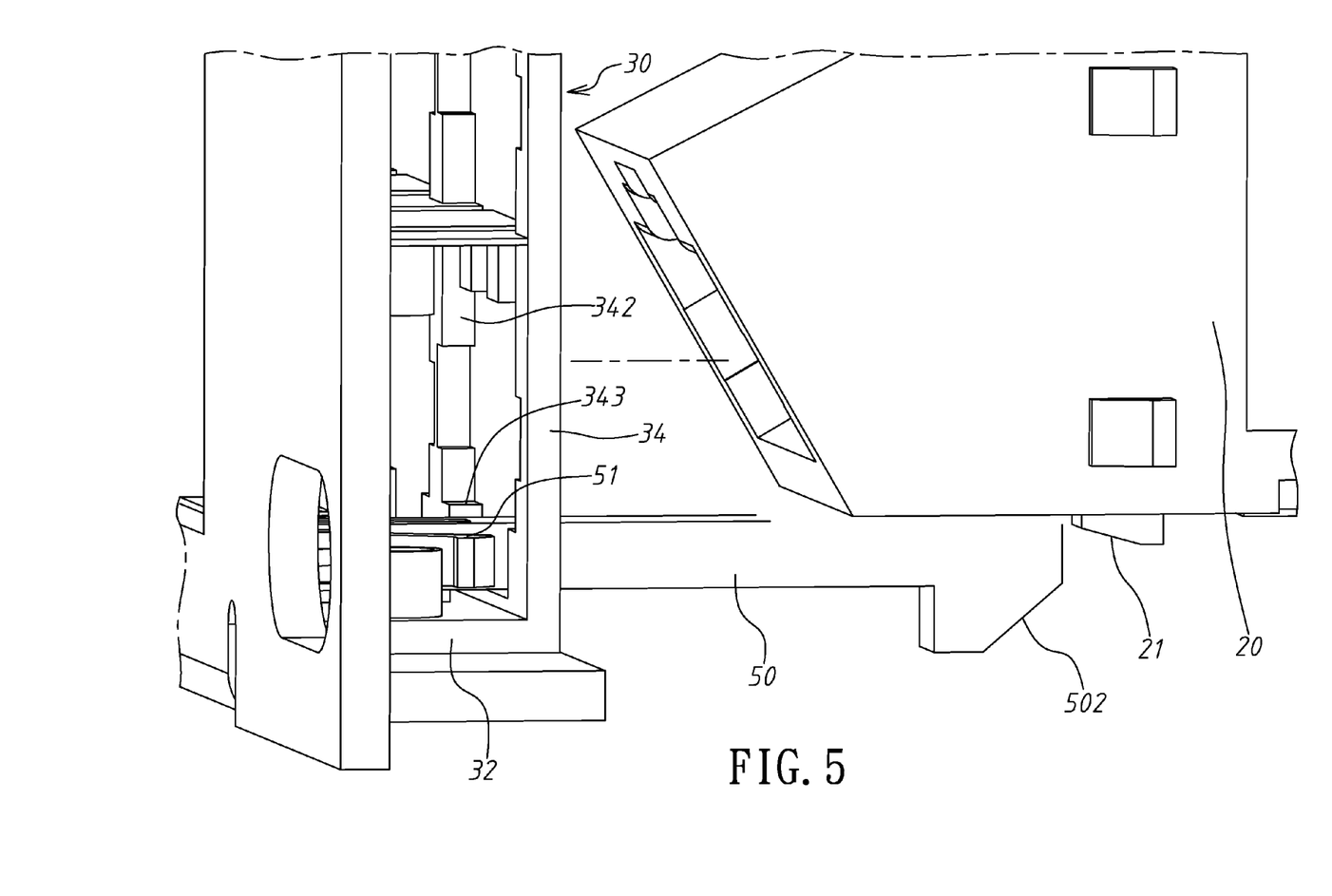
FIG. 5 is a side view, in an enlarged scale, of FIG. 4.
Figure 6:
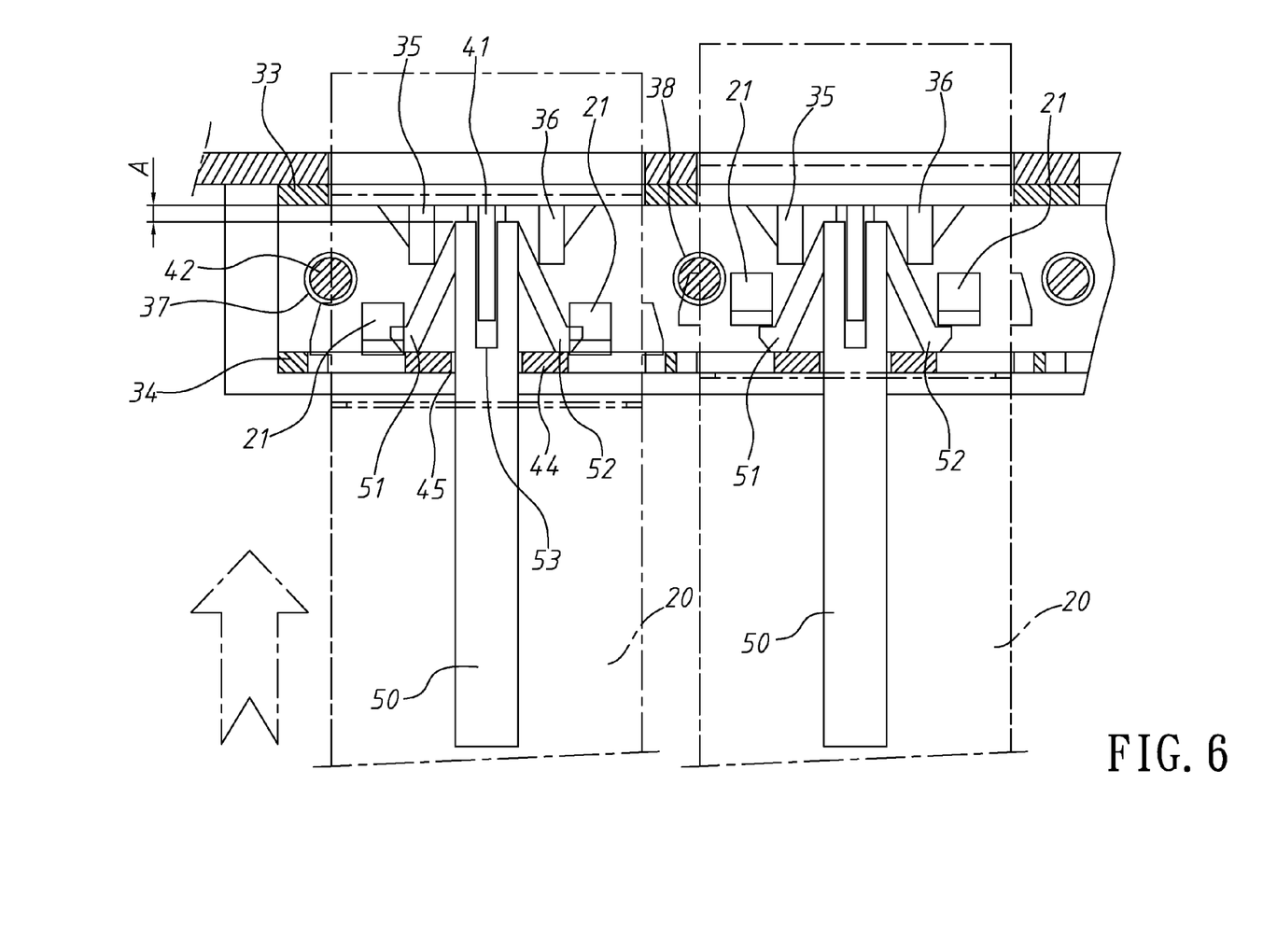
FIG. 6 is a schematic top view of a part of the quick-detachable modular jack and face panel mounting structure in accordance with the present invention, illustrating one modular jack installed in the inner positioning frame and another modular jack initially set in the inner positioning frame.

Referring to FIGS. 4 and 5 again, each modular jack 20 comprises a fastening structure. The fastening structure comprises at least one, for example, a plurality of hook blocks 21 protruded from periphery thereof for engagement with the springy retaining arms 51;52 of one respective control rod 50. FIG. 6 illustrates two modular jacks 20 inserted into the inner positioning frame 30, wherein the left modular jack 20 is partially inserted into the inner positioning frame 30; the right modular jack 20 has been fully inserted into the inner positioning frame 30 and locked by the springy retaining arms 51;52 of the respective control rod 50.

Figure 7:
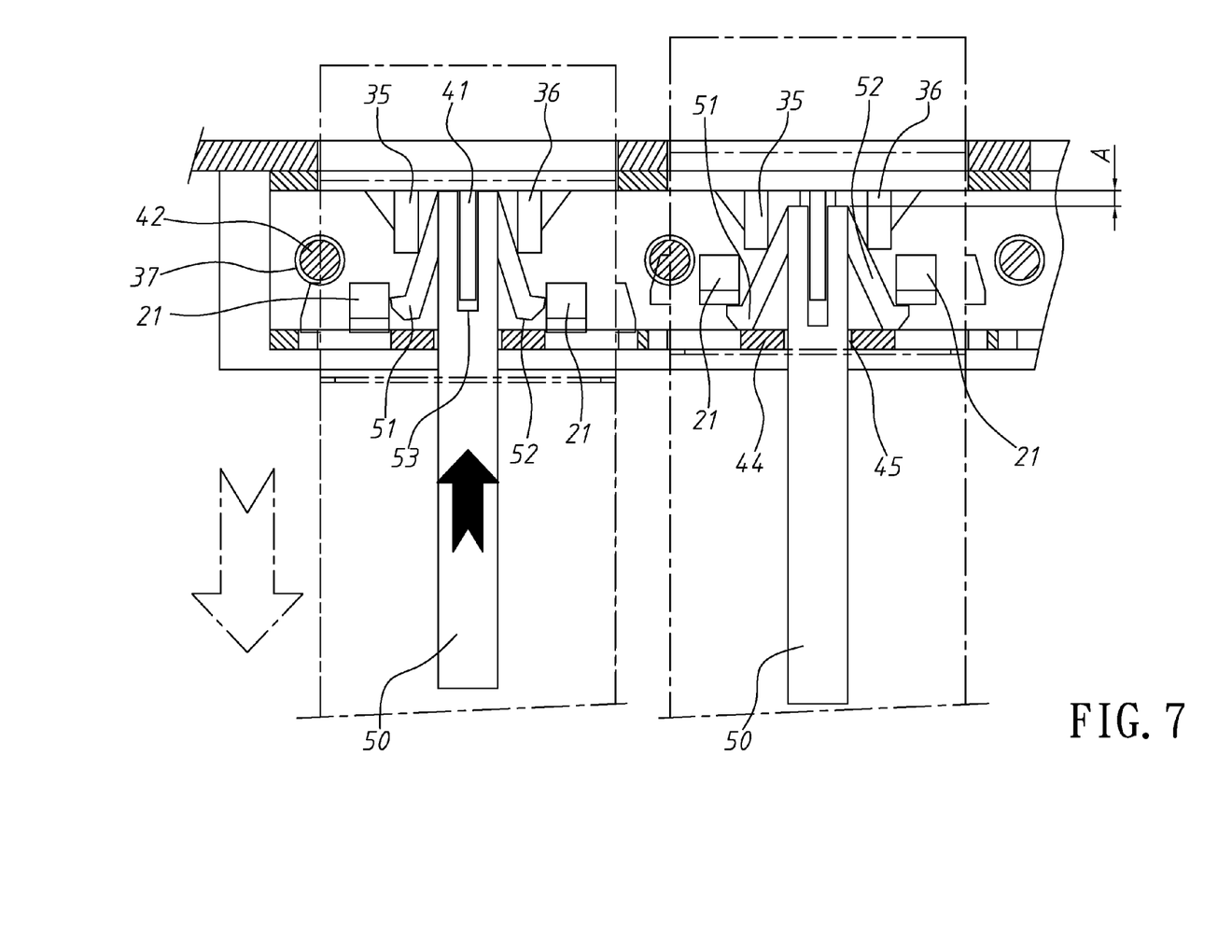
FIG. 7 corresponds to FIG. 6, illustrating one modular jack set in the inner positioning frame in position and another modular jack initially released from the inner positioning frame.

FIG. 7 illustrates one modular jack 20 (the one on the right side) locked to the inner positioning frame 30 and another modular jack 20 (the one on the left side) unlocked from the inner positioning frame 30. Because an operating gap A is left between the front engagement end 501 of each control rod 50 and the front panel 33 of the inner positioning frame 30, the control rod 50 can be pushed inward to disengage the respective springy retaining arms 51;52 from the respective hook blocks 21 of the respective modular jack 20, allowing the respective modular jack 20 to be removed from the inner positioning frame 30.

The quick-detachable modular jack and face panel mounting structure of the present invention is suitable for use in a small-sized, high-density network system to hold a large amount of modular jacks in rows. By means of operating the exposed control rods, loaded modular jacks can be quickly detached from the face panel and the inner positioning frame for replacement or repair.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A quick-detachable modular jack and face panel mounting structure, comprising:
    a face panel comprising at least one modular jack hole;
    at least one modular jack mounted in one said modular jack hole of said face panel, each said modular jack comprising a fastening structure;
    an inner positioning frame mounted at the back side of said face panel, said inner positioning frame comprising a bottom panel, and at least one constraint structure located at said bottom panel;
    at least one control rod mounted in said inner positioning frame and adapted to releasably lock said at least one modular jack, each said control rod comprising a front engagement end engageable into one said constraint structure of said inner positioning frame and a rear operating end suspending outside said inner positioning frame and operable to unlock the respective said control rod from the respective said modular jack;
    an operating gap defined between a part of said inner positioning frame and the front engagement end of each said control rod; and
    a limiter plate vertically movably mounted in said inner positioning frame and adapted to hold down said at least one control rod in said inner positioning frame.

2. The quick-detachable modular jack and face panel mounting structure as claimed in claim 1, wherein each said constraint structure of said inner positioning frame comprises two stop blocks spaced from each other by a predetermined distance, and two plug holes respectively disposed adjacent to said stop blocks; said limiter plate comprises a plurality of plug rods respectively pluggable into the plug holes of said at least one constraint structure of said inner positioning frame.

3. The quick-detachable modular jack and face panel mounting structure as claimed in claim 2, wherein said limiter plate further comprises at least one guide block; each said control rod further comprises a guide slot longitudinally located at the front engagement end thereof and detachably coupled to one said guide block of said limiter plate.

4. The quick-detachable modular jack and face panel mounting structure as claimed in claim 1, wherein said face panel comprises an elongated slot cut through opposing front and back sides thereof and disposed in horizontal; said inner positioning frame comprises opposing front panel and back panel respectively upwardly extended from opposing front and rear sides of said bottom panel in a parallel manner and at least one window opening cut through said front panel and said back panel, each said window opening forming with said elongated slot one respective said modular jack hole, said back panel comprising at least one back panel component; said limiter plate comprising at least one guide notch respectively coupled to said at least one back panel component.

5. The quick-detachable modular jack and face panel mounting structure as claimed in claim 2, wherein said face panel comprises an elongated slot cut through opposing front and back sides thereof and disposed in horizontal; said inner positioning frame comprises opposing front panel and back panel respectively upwardly extended from opposing front and rear sides of said bottom panel in a parallel manner and at least one window opening cut through said front panel and said back panel, each said window opening forming with said elongated slot one respective said modular jack hole, said back panel comprising at least one back panel component; said limiter plate comprising at least one guide notch respectively coupled to said at least one back panel component.

6. The quick-detachable modular jack and face panel mounting structure as claimed in claim 3, wherein said face panel comprises an elongated slot cut through opposing front and back sides thereof and disposed in horizontal; said inner positioning frame comprises opposing front panel and back panel respectively upwardly extended from opposing front and rear sides of said bottom panel in a parallel manner and at least one window opening cut through said front panel and said back panel, each said window opening forming with said elongated slot one respective said modular jack hole, said back panel comprising at least one back panel component; said limiter plate comprising at least one guide notch respectively coupled to said at least one back panel component.

7. The quick-detachable modular jack and face panel mounting structure as claimed in claim 4, wherein the fastening structure of each said modular jack comprises a plurality of hook blocks; each said control rod comprises at least one springy retaining arm obliquely backwardly extended from the front engagement end thereof and stoppable against one said constraint structure of said inner positioning frame and adapted for engagement with the hook blocks of the fastening structure of one said modular jack.

8. The quick-detachable modular jack and face panel mounting structure as claimed in claim 5, wherein the fastening structure of each said modular jack comprises a plurality of hook blocks; each said control rod comprises at least one springy retaining arm obliquely backwardly extended from the front engagement end thereof and stoppable against one said constraint structure of said inner positioning frame and adapted for engagement with the hook blocks of the fastening structure of one said modular jack.

9. The quick-detachable modular jack and face panel mounting structure as claimed in claim 6, wherein the fastening structure of each said modular jack comprises a plurality of hook blocks; each said control rod comprises at least one springy retaining arm obliquely backwardly extended from the front engagement end thereof and stoppable against one said constraint structure of said inner positioning frame and adapted for engagement with the hook blocks of the fastening structure of one said modular jack.

10. The quick-detachable modular jack and face panel mounting structure as claimed in claim 7, wherein said limiter plate comprises at least one end flange, a rear opening located on each said end flange corresponding to one respective said guide block, and a plurality of open slots respectively disposed at two opposite lateral sides relative to each said end flanges and adapted to expose the at least one springy retaining arm of each said control rod.

11. The quick-detachable modular jack and face panel mounting structure as claimed in claim 8, wherein said limiter plate comprises at least one end flange, a rear opening located on each said end flange corresponding to one respective said guide block, and a plurality of open slots respectively disposed at two opposite lateral sides relative to each said end flanges and adapted to expose the at least one springy retaining arm of each said control rod.

12. The quick-detachable modular jack and face panel mounting structure as claimed in claim 9, wherein said limiter plate comprises at least one end flange, a rear opening located on each said end flange corresponding to one respective said guide block, and a plurality of open slots respectively disposed at two opposite lateral sides relative to each said end flanges and adapted to expose the at least one springy retaining arm of each said control rod.

\* \* \* \* \*